Sept. 15, 1931.  W. G. HIATT  1,823,801
GAUGING DEVICE
Filed March 31, 1930  2 Sheets-Sheet 1
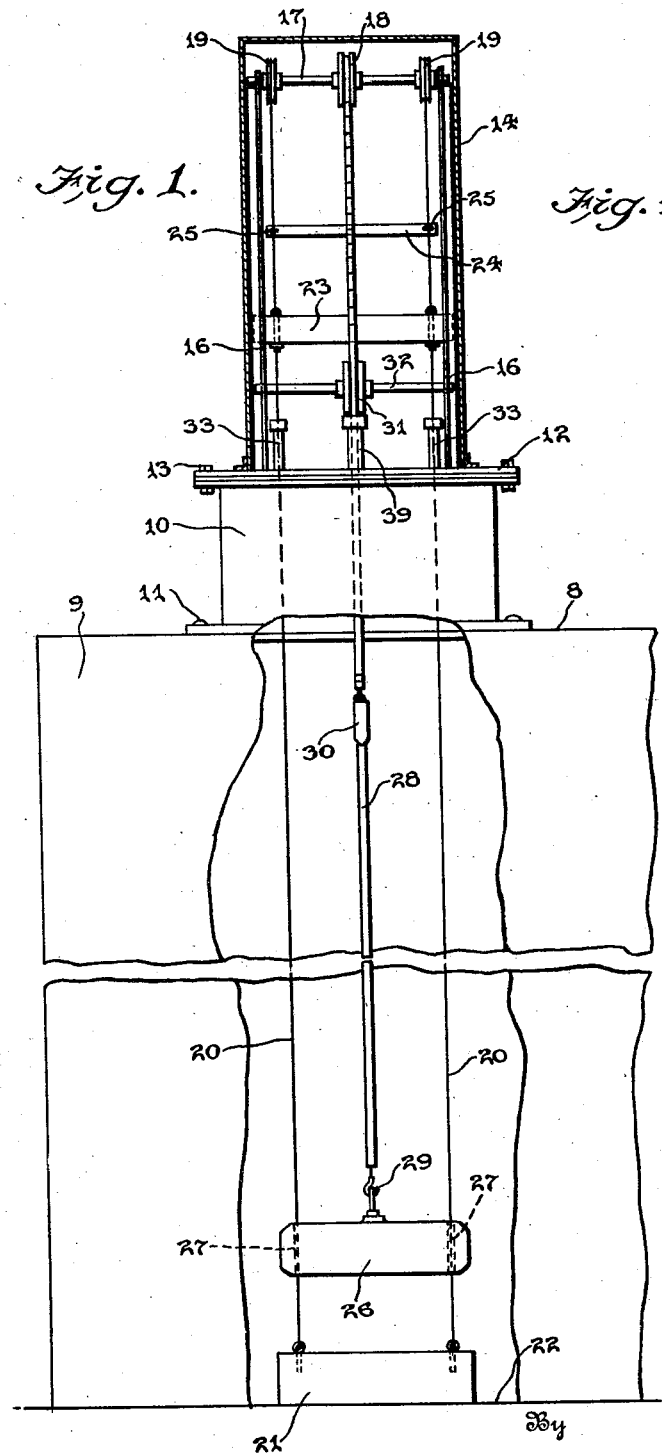
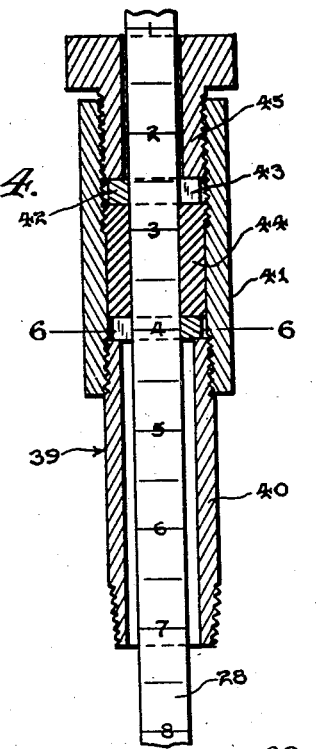
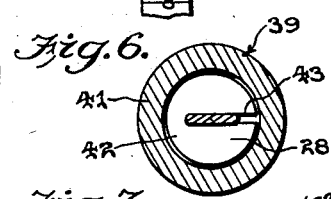
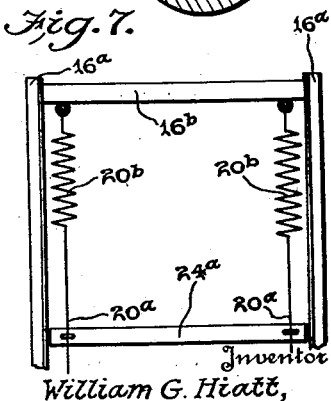
Inventor
William G. Hiatt,
By Robt. E. Barry
Attorney

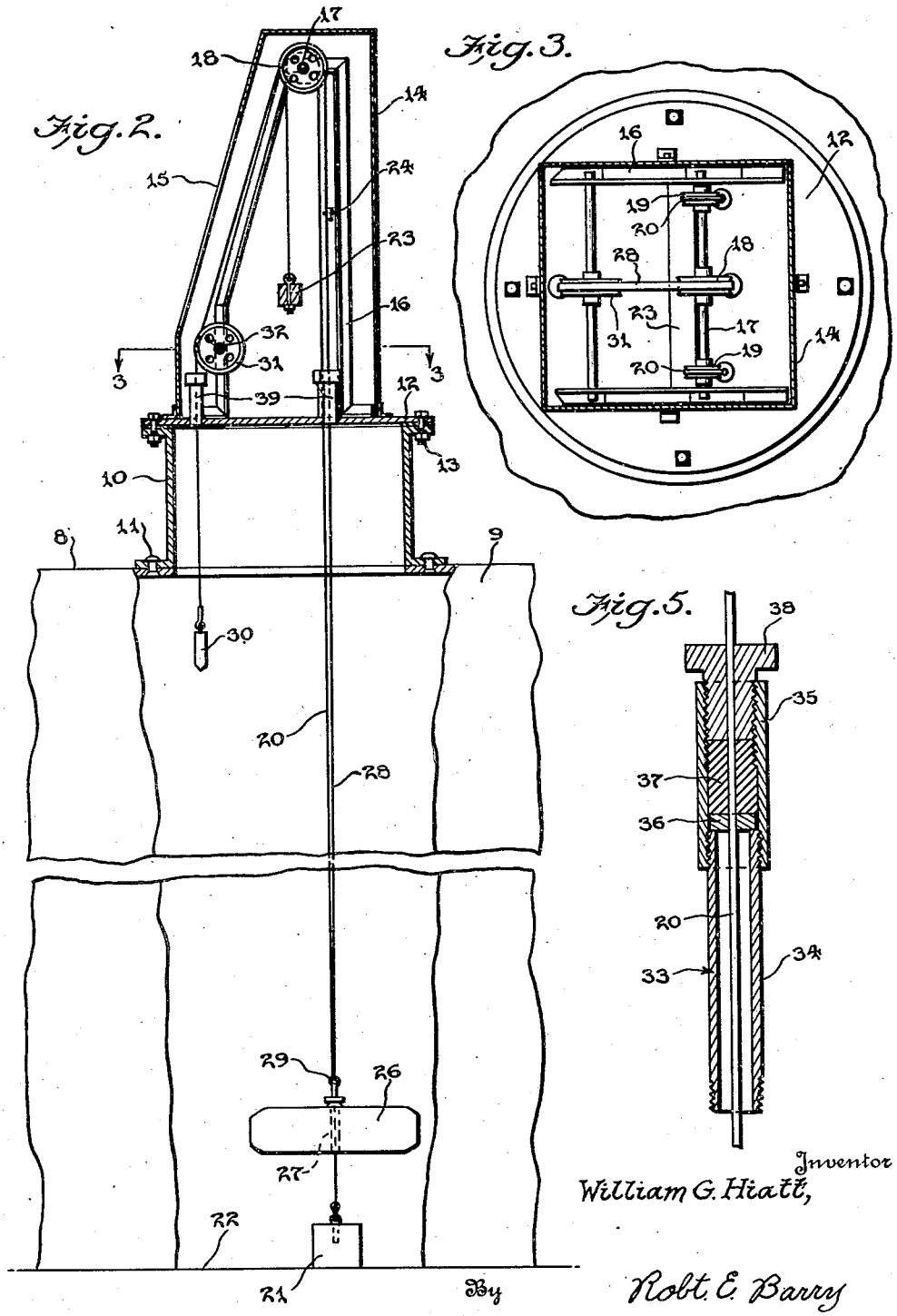

Patented Sept. 15, 1931

1,823,801

UNITED STATES PATENT OFFICE

WILLIAM G. HIATT, OF BARTLESVILLE, OKLAHOMA, ASSIGNOR TO PHILLIPS PETROLEUM COMPANY, OF BARTLESVILLE, OKLAHOMA, A CORPORATION OF DELAWARE

GAUGING DEVICE

Application filed March 31, 1930. Serial No. 440,364.

This invention relates to improvements in gauging devices for tank liquids, and more especially to a novel gauging device for large storage tanks in which volatile liquids, such as petroleum oil, are stored.

It has been customary to provide such a tank with a float operated calibrated tape that passes over a guide pulley on the roof of the tank, and cooperates with an indicator or mark on the roof. However, as the roof rises and falls, due to variation of the internal pressure of the tank, this results in inaccuracy.

One of the salient objects of the present invention is to provide a gauging device which will eliminate such inaccuracy, and this is brought about principally by connecting a measuring bar or its equivalent, fixedly relatively to the bottom of the tank, but in such manner that the roof may move relatively to the bar, so that even if the roof rises or falls, said measuring bar will remain in a fixed position, and will always accurately cooperate with the tape to measure the innage or outage.

A further object is to combine with a volatile liquid storage tank, the roof of which rises and falls, a float operated calibrated element which cooperates with a stationary indicator that is fixed relatively to the bottom of the tank, and which remains in a predetermined position, regardless of the rise and fall of the roof.

Another object is to furnish a device of this character, in which the indicating portion of the same may be exhibited at the exterior of the tank without liability of losing vapors from the tank at this point, or permitting air to enter the tank through the device.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a front elevation of my gauging device shown in use with an oil storage tank, the latter being broken away to facilitate illustration.

Fig. 2 is a similar view taken at right angles to Fig. 1.

Fig. 3 is a top plan view of my device.

Fig. 4 is a vertical sectional view of the stuffing box through which the gauging tape extends from the float to the gauge housing.

Fig. 5 is a similar view of a stuffing box such as may be used for the wires which guide the float and support the measuring bar.

Fig. 6 is a sectional view of a detail on the line 6—6 of Fig. 4.

Fig. 7 is a fragmentary view of a modification.

In accordance with the invention, the roof 8 of an oil storage tank 9 or the like is provided with a manhole tube 10 which has its lower edge connected to the roof by any suitable means, such as bolts 11 to prevent any passage of vapor out of the tank along the line of connection, and to prevent any air from entering the tank along this line.

A manhole cover 12 tightly closes the upper end of the tube, and is detachably connected to the latter by bolts 13 for example, and on the cover, I place a hood 14 having a window 15 in the front of the same to permit inspection from the exterior.

Two upstanding brackets 16 forming a frame are arranged within the hood, and their upper ends are apertured to form bearings for a shaft 17, which supports a main rotatable pulley 18, and auxiliary rotatable pulleys 19, the latter being arranged at opposite sides of the main pulley.

Guide wires 20 have their lower ends anchored to a weight 21 which rests upon the bottom 22 of the tank, and the upper portions of these wires pass over the pulleys 19, and are secured to a counterweight 23. It will thus be understood that as the roof 8 rises and falls, the counterweight will also rise and fall, and permit the shaft 17 to move toward or away from the bottom 22 as the case may be. For the purposes of the present invention, any suitable indicator, such as a measuring bar 24, is rigidly secured to the guide wires at points 25 within the hood, directly behind the window 15, and it will be observed that such bar will remain stationary, regardless of the rising and falling of the roof.

A float 26 has vertical passageways 27 therethrough to receive the wires 20 for the purpose of guiding the float, and a calibrated tape 28 has its lower end secured to the float at the point 29. The calibrated portion of this tape passes over the pulley 18 and extends back into the tank, where its other end is provided with a counterweight 30. For the purpose of preventing the last mentioned weight from interfering with the rise and fall of the float, the suspended portion of the tape is held off to one side of the path of movement of the float, by means of a guide pulley 31, carried by a shaft 32 that has its ends journaled in the forward portions of the brackets 16.

At this point it will be observed from Fig. 1 that the calibrations of the tape are arranged in front of the measuring bar 24, and obviously, one looking through the window 15, can note which figure of the scale is in alignment with the measuring bar, and thereby determine the contents of the tank.

For the purpose of preventing vapors from rising into the hood through the holes in the plate 12 through which the wires and tape pass, at the points where the guide wires extend through, the cover has stuffing boxes 33 of the type shown in Fig. 5. Each of these boxes may consist of a nipple 34 having its lower end threaded for connection to the manhole cover, and having its upper end threaded for connection to a pipe coupling 35. In this coupling, a metal washer 36 rests on the upper end of the nipple, and supports a packing sleeve 37 which is compressed by a hollow nut 38 that screws into the upper end of the coupling. By means of the screw, the packing 37 may be caused to snugly engage the wire 20 to prevent any vapor or gas rising through the stuffing box.

The calibrated tape extends through two stuffing boxes 39 that are supported by the manhole cover. For example, as shown in Fig. 4, each of these stuffing boxes comprises a nipple 40 having its lower end threaded for connection with the cover, and its upper end threaded for connection to a pipe coupling 41. A washer 42 of the special construction shown in Fig. 6 is placed in the coupling on the upper edge of the nipple and has a slot 43 cut into the same from the edge thereof for the purpose of straddling the tape 28 from the right side of the latter. A packing sleeve 44 fits in the coupling and surrounds the tape, and on the packing, I arrange another one of the washers 42, but position it so that it straddles the tape from the left side thereof, so as to break joints with the first mentioned washer. A gland 45 has a threaded connection with the coupling 41 for the purpose of compressing the packing 44.

In operation, it will be understood that when oil is introduced into the tank 9, the float 26 will rise, and as it does so, the counterweight 30 will descend as the tape passes over the rotatable pulley 18, and of course, as the calibrated portion of the tape crosses the measuring bar 24, the amount of liquid in the tank can always be accurately determined, due to the fact that the bar is anchored relatively to the bottom of the tank, and will not conflict even though the roof ascends or descends.

Instead of passing the upper end portions of the guide wires 20 over pulleys and providing them with a counterweight, as shown in Fig. 7, the upper ends of the supporting brackets 16a may be rigidly connected to a supporting bar 16b, and the upper ends of the guide wires 20a which carry the measuring bar 24a, can be connected to the bar by means of coil springs 20b. Of course, as the roof rises and falls, these coil springs will vary in length, but always hold the measuring bar at a fixed level.

While I have disclosed what I now consider to be preferred embodiments of the invention in such manner that the construction, operation and advantages thereof may be readily understood, I am aware that changes may be made in the details disclosed, without departing from the spirit of the invention, as expressed in the claims.

What I claim and desire to secure by Letters Patent is:

1. A gauging device for a liquid tank having a roof, comprising supporting means supported by the roof, an indicator supported from the supporting means, means for fixing said indicator relatively to the bottom of the tank, but allowing the roof to rise and fall independently of the indicator, and calibrated means cooperating with said indicator and including an element adapted to rise and fall with the liquid in the tank.

2. The combination with a liquid tank having a roof, of supporting means mounted on said roof and adapted to rise and fall with the latter, a calibrated member having a buoyant element to rise and fall with the liquid in the tank, guiding means for said member carried by the supporting means, an indicator cooperating with the calibrated member, means for anchoring said indicator relatively to the bottom of the tank, and yielding means connecting said indicator to said supporting means.

3. The combination with a tank having a roof which may rise and fall, of supporting means mounted on said roof to rise and fall with the latter, a calibrated tape, a float arranged in the tank and connected to one end of said tape, a counterweight connected to the other end of the tape, guiding means for the tape carried by said supporting means, an indicator arranged in close proximity to a calibrated portion of the tape, means for fixedly anchoring the indicator relatively to the bottom of the tank, and yielding means connecting said indicator to the supporting means.

4. The combination with a liquid tank having a roof which may rise and fall, of supporting means mounted on said roof, a float arranged in the tank, a calibrated tape having one of its ends connected to the float, a counterweight connected to the other end of the tape, guide means for the tape carried by said supporting means, a guiding element for the float extending upwardly from the bottom of the tank into said supporting means, and an indicator arranged in close proximity to a calibrated portion of the tape and fixedly secured to the guiding element of the float.

5. The combination with a liquid tank having a roof which may rise and fall, of supporting means mounted on the roof, guide wires having their lower ends fixed relatively to the bottom of the tank, and their upper ends yieldably connected to the supporting means, a float in the tank guided by said wires, a calibrated tape connected at one end to said float, a counterweight connected to the other end of the tape guiding means for the tape carried by the supporting means, and an indicator extending across a calibrated portion of the tape and fixedly secured to said guide wires.

6. The combination with a tank having a roof which may rise and fall, of supporting means mounted on the roof and carrying guide pulleys, guide wires having their lower ends anchored to the bottom of the tank and their upper end portions passing over some of said guide pulleys, a counterweight fixed to the other ends of the wires, a measuring bar anchored to the wires and arranged between the top of the tank and the pulleys which guide the wires, a float in the tank guided by said wires, and means including a calibrated element actuated by said float and crossing said measuring bar.

7. The combination with a liquid tank having a roof which may rise and fall, of supporting means mounted on the roof, a shaft carried by the supporting means, rotatable pulleys mounted on the shaft, guide wires having their lower ends anchored to the bottom of the tank, and their upper end portions passing over said pulleys, a counterweight secured to the other ends of the wires, a measuring bar fixedly connected to the wires between the lower ends of the wires and the portions of the same which pass over said pulleys, a float arranged in the tank and guided by said wires, a third pulley mounted on said shaft, a calibrated tape having one of its ends connected to the float, said tape passing over the third pulley and crossing the measuring bar, and a counterweight carried by the other end of the tape.

8. The combination with a tank having a movable top, of a housing arranged on said top, supporting means arranged within the housing, a float operated calibrated element extending from the interior of the tank into said housing, guide means for said element carried by said supporting means, an indicator in the housing, means for supporting said indicator at a fixed elevation relatively to the bottom of the tank and including an element extending from the housing to the bottom of the tank, and stuffing boxes surrounding said elements to prevent communication between the housing and the interior of the tank.

9. The combination with a tank having a movable top, of a housing arranged on said top, supporting means arranged within the housing, a float operated calibrated element extending from the interior of the tank into said housing, guide means for said element carried by said supporting means, an indicator in the housing, means for supporting said indicator at a fixed elevation relatively to the bottom of the tank and including an element extending from the housing to the bottom of the tank, and stuffing boxes surrounding said elements to prevent communication between the housing and the interior of the tank, each of said stuffing boxes comprising a nipple, a pipe coupling connected to the nipple, packing arranged in the pipe coupling, and a gland for compressing the packing.

10. The combination with a tank having a movable top, of a housing arranged on said top, supporting means arranged within the housing, a float operated calibrated element extending from the interior of the tank into said housing, guide means for said element carried by said supporting means, an indicator in the housing, means for supporting said indicator at a fixed elevation relatively to the bottom of the tank and including an element extending from the housing to the bottom of the tank, and stuffing boxes surrounding said elements to prevent communication between the housing and the interior of the tank, each of said stuffing boxes comprising a nipple, a pipe coupling connected to the nipple, a washer in the coupling resting on the nipple, a packing in the coupling resting on the washer, and a gland for compressing said packing.

11. The combination with a tank having a movable top, of a housing arranged on said top, supporting means arranged within the housing, a float operated calibrated element extending from the interior of the tank into said housing, guide means for said element carried by said supporting means, an indicator in the housing, means for supporting said indicator at a fixed elevation relatively to the bottom of the tank and including an element extending from the housing to the bottom of the tank, and stuffing boxes surrounding said elements to prevent communication between the housing and the interior of the tank, one of said stuffing boxes including a nipple, a pipe coupling connected to the nipple, a slotted washer resting on the nipple and straddling the element which passes therethrough from one side of said element, a packing resting on said washer, another slotted washer straddling the last mentioned element from the opposite side thereof, and a gland screwed into the coupling and engaging the last mentioned washer.

12. The combination with a liquid containing tank having a movable roof, of a manhole tube mounted on the roof, a cover for the tube detachably connected to the other end of the latter, brackets mounted on said cover, shafts supported by the brackets, pulleys mounted on one of said shafts, guide wires having their lower ends anchored to the bottom of the tank, said wires passing through said cover and having their upper end portions extending over the pulleys, a counterweight secured to the other ends of the wires, a measuring bar fixedly secured to the wires between the points where they pass through the cover plate and said pulleys, a set of guide pulleys mounted on the shafts, a float in the tank guided by said wires, a calibrated tape having one of its ends connected to said float, said tape extending upwardly through the cover over said set of pulleys, and then back through the cover into the tank, a counterweight secured to the other end of the tape, said tape extending across the measuring bar.

13. The combination with a liquid containing tank having a movable roof, of a manhole tube mounted on the roof, a cover for the tube detachably connected to the other end of the latter, brackets mounted on said cover, shafts supported by the brackets, pulleys mounted on one of said shafts, guide wires having their lower ends anchored to the bottom of the tank, said wires passing through said cover and having their upper end portions extending over the pulleys, a counterweight secured to the other ends of the wires, a measuring bar fixedly secured to the wires between the points where they pass through the cover plate and said pulleys, a set of guide pulleys mounted on the shafts, a float in the tank guided by said wires, a calibrated tape having one of its ends connected to said float, said tape extending upwardly through the cover over said set of pulleys, and then back through the cover into the tank, a counterweight secured to the other end of the tape, said tape extending across the measuring bar, and a hood mounted on said cover plate and housing the brackets, measuring bar, shafts and pulleys.

In testimony whereof, I hereto affix my signature.

WILLIAM G. HIATT.